(12) United States Patent
Dees et al.

(10) Patent No.: US 11,150,339 B2
(45) Date of Patent: Oct. 19, 2021

(54) SYSTEM FOR VERIFYING DISTANCE MEASUREMENTS

(71) Applicant: KONINKLIJKE PHILIPS N.V., Eindhoven (NL)

(72) Inventors: Walter Dees, Eindhoven (NL); Franciscus Antonius Maria Van De Laar, Veldhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 208 days.

(21) Appl. No.: 15/777,408

(22) PCT Filed: Nov. 21, 2016

(86) PCT No.: PCT/EP2016/078219
§ 371 (c)(1),
(2) Date: May 18, 2018

(87) PCT Pub. No.: WO2017/089247
PCT Pub. Date: Jun. 1, 2017

(65) Prior Publication Data
US 2018/0335514 A1    Nov. 22, 2018

(30) Foreign Application Priority Data
Nov. 23, 2015 (EP) ..................... 15195759

(51) Int. Cl.
*G01S 13/76* (2006.01)
*G01S 7/36* (2006.01)
(Continued)

(52) U.S. Cl.
CPC .............. *G01S 13/765* (2013.01); *G01S 7/36* (2013.01); *G01S 7/40* (2013.01); *G01S 13/74* (2013.01)

(58) Field of Classification Search
CPC . G01S 13/765; G01S 7/36; G01S 7/40; G01S 13/74
(Continued)

(56) References Cited

U.S. PATENT DOCUMENTS 6,002,708 A * 12/1999 Fleming .................. G01S 1/045
327/336
8,750,267 B2    6/2014 Aggarwal et al.
(Continued)

FOREIGN PATENT DOCUMENTS

| WO | WO2006075280 A2 | 7/2006 |
| WO | WO2007121488 A1 | 10/2007 |
| WO | 2008059882 A1 | 5/2008 |

*Primary Examiner* — Bo Fan

(57) ABSTRACT

A first device (110) for distance measurement via wireless communication (130) uses a ranging protocol for determining a distance (140) to a second device (120) via a round trip time measurement, wherein first time data represents the round trip time and second time data represents a response time between receiving a request and sending a corresponding acknowledge. The second device receives the round trip time and determines the distance. The first device determines third time data by subtracting from the first time data a calculated travelling time of the messages between the first device and the second device based on the determined distance, and determines identifier data indicative of hardware and/or software present in the second device. The device then obtains, from a database based on the identifier data, a reference interval value, and verifies whether the determined distance is reliable by comparing the third time data to the reference interval value.

20 Claims, 6 Drawing Sheets

(51) Int. Cl.
*G01S 13/74* (2006.01)
*G01S 7/40* (2006.01)

(58) Field of Classification Search
USPC .............................................. 342/44, 27, 134
See application file for complete search history.

(56) References Cited

U.S. PATENT DOCUMENTS

2009/0076911 A1     3/2009  Vo
2010/0130229 A1*    5/2010  Sridhara ................. G01S 19/49
                                                            455/456.1
2014/0355461 A1*    12/2014 Aldana ................. H04W 64/00
                                                            370/252

* cited by examiner

SYSTEM FOR VERIFYING DISTANCE MEASUREMENTS

FIELD OF THE INVENTION

The invention relates to a device for distance measurement via wireless communication according to a predetermined protocol between the device acting as a first device and a further device for wireless communication acting as a second device. The invention further relates to a method for distance measurement, a provider server method, and computer program products for use in a device or server.

The present invention relates generally to the field of indoor location systems, and more in particular provides various devices and methods for verifying distance measurements as well as corresponding computer program products.

BACKGROUND OF THE INVENTION

A need for location aware services exists in indoor areas. For example in large indoor complexes, such as hospitals, universities, parking lots, shopping malls, and/or offices, wireless services may be provides to mobile devices at close distance. An indoor location system may provide a service to consumers (hereafter end-users); a service that end-users will eventually rely on. Such location based services may be provided only to devices that are close by, i.e. at a limited distance to the service providing device. It is therefore important that the distance measurement is reliable. One aspect of reliability for an end-user is the accuracy of the distance that is being reported.

Location based services are increasingly being deployed in various advertisement, payment, shopping and other environments, using a multitude of recently introduced technologies, such as NFC, iBeacon, coded light, etc. See e.g. the article "Beacons close in on proximity-based applications" by George Malim" available via http://www.wireless-mag.com/Features/33937/beacons-close-in-on-proximity-based-applications.aspx #.VfwrlvnBG_k. For example NFC is even used for payments because due to its close proximity based on the very limited signal range it is trusted to be safe.

A known system for distance measurement is recently developed in a new version of the protocol for wireless communication defined in IEEE 802.11. The new version comprises a ranging protocol for determining a distance between two devices, and allows for accurate distance measurement and determining location of devices up to 1 meter or even lower resolution. The ranging protocol, called Fine Timing Measurement procedure (FTM), is defined in [reference 1] IEEE 802.11REV-mc Chapter 10.24.6, and accurately measures the Round-Trip Time (RTT) of the signal using measurement messages, and derives the distance based on the measured travelling time of the messages.

We note that this application is in the field of ranging protocols. These correspond to what is known as time-of-flight measurements which measure the time it take for the electromagnetic radiation to travel between the transmitter and the receiver. They are fundamentally different than the distance measurement as performed in IP/HTTP protocol, a.k.a. ping times, which measure the time it takes for an IP data packet to transit in a network from a source device to a sink device, wherein such transit may include a number of intermediate devices. Assuming a wireless signal propagated in free air with substantially the speed of light, it takes 3.3 ns for the radiation to cover a distance of a meter while Wi-Fi station are able to reach a time granularity of around 0.1 ns. In contrast, in IP protocols ping distances are in the order of ms (hence 6 orders or magnitude higher). For example, in HDCP (High Definition Content Protection) 2.0 standard, distance measurement is performed based on pinging and a received is deemed in close proximity if the round trip is less than 20 ms.

SUMMARY OF THE INVENTION

In order for two devices to determine the distance between each other based on round trip time measurements, they need to cooperate. An initiating wireless device that initiates a request to start a round trip time measurement needs the responding device to determine an interval between sending a message and receiving the response, and send the time interval to the initiating device. By sending false data a device can actually claim it is closer or further away than it is in reality. This could lead to possible abuse of a location based service if a device trusts received distance/location information to be accurate. For example a location based service may automatically start some transaction.

In the known system the measurement data or the received distance may be tampered with and therefore cannot be fully trusted.

It is an object of the invention to provide a system for making round trip time based distance measurement more trustworthy.

For this purpose devices and methods are provided as defined in the appended claims.

There is provided a method for distance measurement via wireless communication according to a predetermined protocol between a device acting as a first device and a further device for wireless communication acting as a second device, the predetermined protocol comprising a ranging protocol for determining a distance between the first and the second device based on a round trip time measurement, in which ranging protocol the first device sends a measurement message at a first time (t1);
the second device receives the measurement message at a second time (t2);
the second device transmits a measurement acknowledge at a third time (t3);
the first device receives the measurement acknowledge at a fourth time (t4);
the method comprising, for assessing the determined distance,
determining or receiving first time data representing a time interval between the first time and the fourth time;
determining or receiving second time data as provided by the second device representing a time interval between the second time and the third time;
determining the distance by determining a travelling time of the messages between the first device and the second device based on the first time data and the second time data;
determining (404) third time data by subtracting from the first time data a calculated travelling time of the messages between the first device and the second device based on the determined distance,
determining identifier data indicative of hardware and/or software present in the second device,
obtaining (405), from a database based on the identifier data, a reference interval value for the second device indicative of an interval between receiving a measurement message and transmitting a measurement acknowledge, verifying (406) whether the determined distance is reliable by comparing the third time data to the reference interval value.

There is further provided a device for distance measurement via wireless communication via wireless communication according to a predetermined protocol between a first device and a second device, the predetermined protocol comprising a ranging protocol for determining a distance between the first and the second device based on a round trip time measurement, in which ranging protocol the first device sends a measurement message at a first time (t1);

the second device receives the measurement message at a second time (t2);

the second device transmits a measurement acknowledge at a third time (t3);

the first device receives the measurement acknowledge at a fourth time (t4);

the device comprising a transceiver (111) for transmitting and receiving messages, a message processor (112) arranged for generating messages to be transmitted and for processing received messages;

the message processor and the transceiver arranged to cooperate to receive or determine first time data representing a time interval between the first time and the fourth time;

receive or determine second time data as provided by the second device representing a time interval between the second time and the third time;

the message processor (112) further arranged, for assessing the determined distance, to determine the distance by determining a travelling time of the messages between the first device and the second device based on the first time data and the second time data;

to determine third time data by subtracting from the first time data a calculated travelling time of the messages between the first device and the second device based on the determined distance, to determine identifier data indicative of hardware and/or software present in the second device, to obtain, from a database based on the identifier data, a reference interval value for the second device indicative of an interval between receiving a measurement message and transmitting a measurement acknowledge, and to verify whether the determined distance is reliable by comparing the third time data to the reference interval value.

There is further provided a provider server method for use in a provider server for cooperating with a first device as described above, the method comprising storing, in a database based on identifier data indicative of hardware and/or software present in respective devices, reference time data for the respective devices indicative of processing time in the ranging protocol, receiving, from the first device, identifier data indicative of hardware and/or software present in the second device, retrieving, from the database, respective reference time data for the second device based on the identifier data, and transmitting, to the first device, the respective reference time data indicative of the reference interval value for the second device, for enabling the first device to verify whether the determined distance is reliable by comparing the third time data to the reference interval value.

In such a ranging protocol the first time data represents the time interval between the first time and the fourth time, e.g. by the values of t1 and t4 or by a difference value of t4−t1. Similarly the second time data represents the time interval between the second time and the third time, e.g. by the values of t2 and t3 or by a difference value of t3−t2. The determining of the distance by determining a travelling time of the messages between the first device and the second device based on the first time data and the second time data requires a calculation of the round trip travelling time by subtracting the time interval t3−t2 represented by the second time data from the time interval t4−t1 represented by the first time data and using the speed of light to derive the actual distance. For example, the ranging protocol may prescribe that the second device performs said calculation and transfers the determined distance to the first device. Alternatively, the second device transfers the second time data to the first device or a further distance calculation device, which perform the calculation. However, in every setup, the second time data as provided by the second device is used enabling said calculation. So a malignant second device may intentionally manipulate the determined distance or erroneous values for the second time data may be provided.

The above features have the effect that when a device participates in a ranging protocol acting as a second device which provides the second time data or the determined distance to a first device, the determined distance is verified by the first device. The distance is calculated by the second device based on a round trip time measurement according to the ranging protocol. Therein first device sends a measurement message at a first time (t1); the second device receives the measurement message at a second time (t2); the second device transmits a measurement acknowledge at a third time (t3); and the first device receives the measurement acknowledge at a fourth time (t4). The first device determines first time data representing a time interval between the first time and the fourth time and sends the first time data to the second device. The second device determines second time data representing a time interval between the second time and the third time, and the distance by determining a travelling time of the messages between the first device and the second device based on the first time data and the second time data. The second device transfers the determined distance to the first device.

However, the second device may intentionally send a different value as the determined distance, e.g. a short distance pretending to be close by the first device. The first device is arranged to verify whether the determined distance is reliable as follows by assessing the determined distance. First third time data is determined by subtracting from the first time data a calculated travelling time of the messages between the first device and the second device based on the determined distance. Also, the first device obtains a reference interval value for the second device indicative of an interval between receiving a measurement message and transmitting a measurement acknowledge. Finally the first device verifies whether the determined distance is reliable by comparing the third time data to the reference interval value. Advantageously, when the calculated third time matches the reference interval value, the reliability of the determined distance is confirmed, and when a substantial difference is found, the determined distance is deemed not reliable. Subsequent processes or access rights are now controlled by the first device in dependence of the verified distance.

It is noted that in the above, for clarity reasons, it has been described as the first device performing the distance measurement and distance reliability verification. However, it is also possible that either the $1^{st}$ device or both devices provide all required information to a $3^{rd}$ device which performs the distance measurement and distance reliability verification.

The message processor is arranged to determine identifier data indicative of hardware and/or software present in the second device, and to obtain the reference interval from a database based on the identifier data. The identifier data may be derived from a message of the predetermined protocol from the second device. Advantageously the database provides reference values for many devices and/or chipsets used in practice.

Optionally, the message processor is arranged for obtaining respective measurement data from multiple respective distance measurements via the ranging protocol and for said assessing by detecting differences between the respective measurement data. Various embodiments are provided for acquiring and using the respective measurement data so as to increase the level of reliability. Advantageously it is more difficult for a malignant second device to manipulate responses so as to make the respective measurement data from multiple measurements consistent at a virtual distance differing from the actual distance.

A method according to the invention may be implemented on a computer as a computer implemented method, or in dedicated hardware, or in a combination of both. Executable code for a method according to the invention may be stored on a computer program product. Examples of computer program products include memory devices such as a memory stick, optical storage devices such as an optical disc, integrated circuits, servers, online software, etc. The computer program product may comprise non-transitory program code means stored on a computer readable medium for performing a method according to the invention when said program product is executed on a computer. In an embodiment, the computer program comprises computer program code means adapted to perform all the steps or stages of a method according to the invention when the computer program is run on a computer. Preferably, the computer program is embodied on a computer readable medium. There is provided a computer program product downloadable from a network and/or stored on a computer-readable medium and/or microprocessor-executable medium, the product comprising program code instructions for implementing a method as described above when executed on a computer.

Another aspect of the invention provides a method of making the computer program available for downloading, for example included in a location based application. This aspect is used when the computer program is uploaded into, e.g., Apple's App Store, Google's Play Store, or Microsoft's Windows Store, and when the computer program is available for downloading from such a store.

Further preferred embodiments of the devices and methods according to the invention are given in the appended claims, disclosure of which is incorporated herein by reference.

BRIEF DESCRIPTION OF THE DRAWINGS

These and other aspects of the invention will be apparent from and elucidated further with reference to the embodiments described by way of example in the following description and with reference to the accompanying drawings, in which.

The figures are purely diagrammatic and not drawn to scale. In the Figures, elements which correspond to elements already described may have the same reference numerals.

DETAILED DESCRIPTION OF EMBODIMENTS

The distance measurement methods and devices using wireless communication as described below provide at least a basic function, i.e. providing information on the current distance between a mobile device to another device, e.g. on a fixed position, usually in an indoor environment.

The above basic function can be used in a distance, location or position based service. This service in turn can be used to provide further services. Within the context of an indoor navigation system, the distance could be used to subsequently direct or guide a device user from one location to another; e.g. along a series of locations; i.e. on a route. Within a shopping context, such a route could be created on the fly; e.g. using a web-based shopping service based on an end-user's shopping list. In the process of navigating along the route, the end-user could be made aware of points of interest, which in a shopping context could represent special offers, etc.

By making a distance based measurement more trustworthy, it becomes a viable tool for reliable proximity based services. Some example use cases include:

If you connect to a nearby wireless keyboard, nearby wireless storage device, nearby sensor or nearby wireless webcam, you want to be sure that you connect to the correct one, and not to some man-in-the-middle device that wants to monitor, copy or trace what you are doing.

If you meet your friend and want to connect to your friend's mobile phone to exchange some pictures, you want to be sure you connect to your friend's phone and not a man-in-the-middle.

If in a house or shop you want to automatically switch on some devices, open some door or allow a person to connect to some service with his mobile device when in close proximity, then you want to make sure the location of that mobile device is correct and not a bogus device that claims to be close by.

If in a shop you want to initiate a transaction, e.g. when close to the register, then you want to be sure that you are not being subjected to a "phishing" attack, whereby a user may be unaware and connect to a phishing device located further away instead of an official service provided by the shop.

Figure 1:
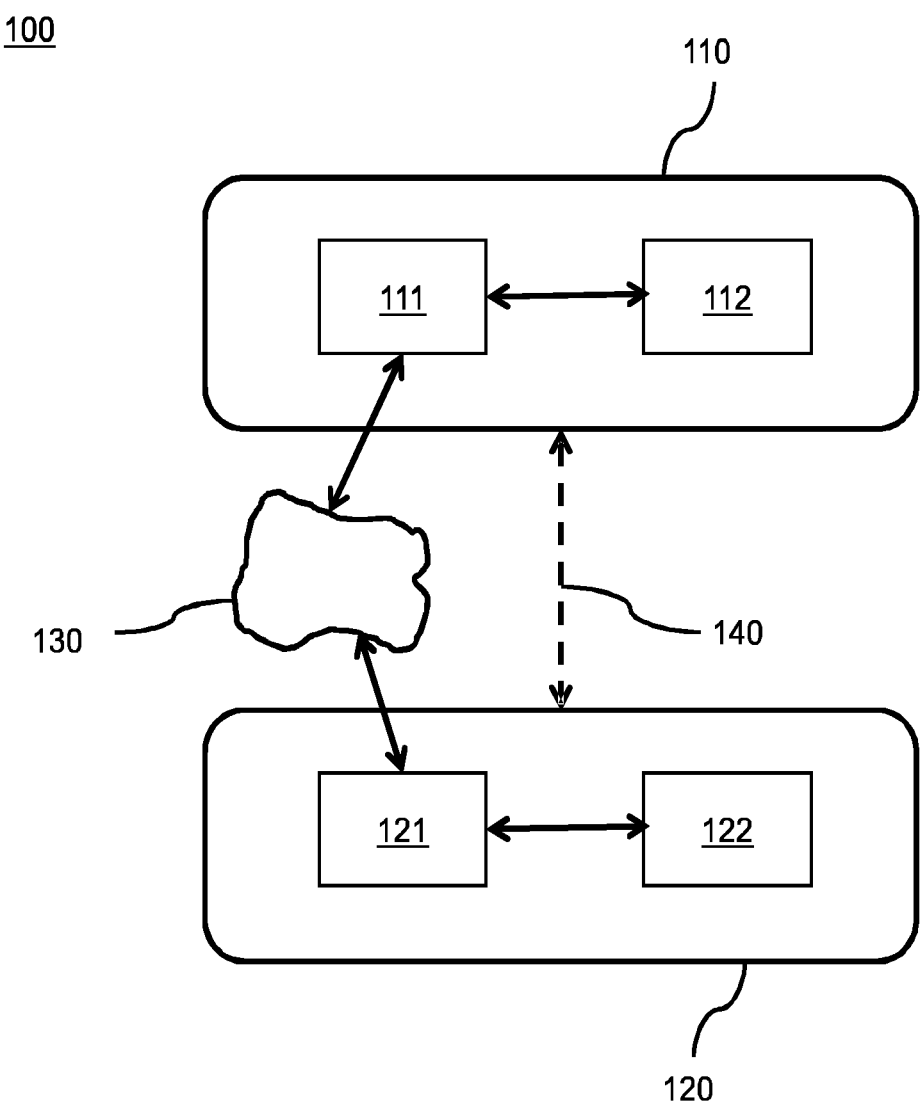
FIG. 1 shows devices for wireless communication and distance measurement.

FIG. 1 shows devices for wireless communication and distance measurement. A system 100 for wireless communication comprises a first device 110 and a second device 120, the devices being physically apart at a distance 140. The first device has a first transceiver 111 and a first message processor 112. Likewise, the second device has a second transceiver 121 and a second message processor 122. The devices are equipped for wireless communication, as schematically indicated by shape 130 and arrows which connect the transceivers 111,121. The devices are arranged for distance measurement via the wireless communication according to a predetermined protocol between the first device and the second device. The predetermined protocol includes a ranging protocol for determining a distance between the first and the second device, as further detailed below with reference to FIG. 2.

In the examples the predetermined protocol is WiFi according to IEEE 802.11 [ref 1, but other wireless protocols may also be used, such as Bluetooth, when provided with an appropriate ranging protocol based on round trip time measurement.

Figure 2:
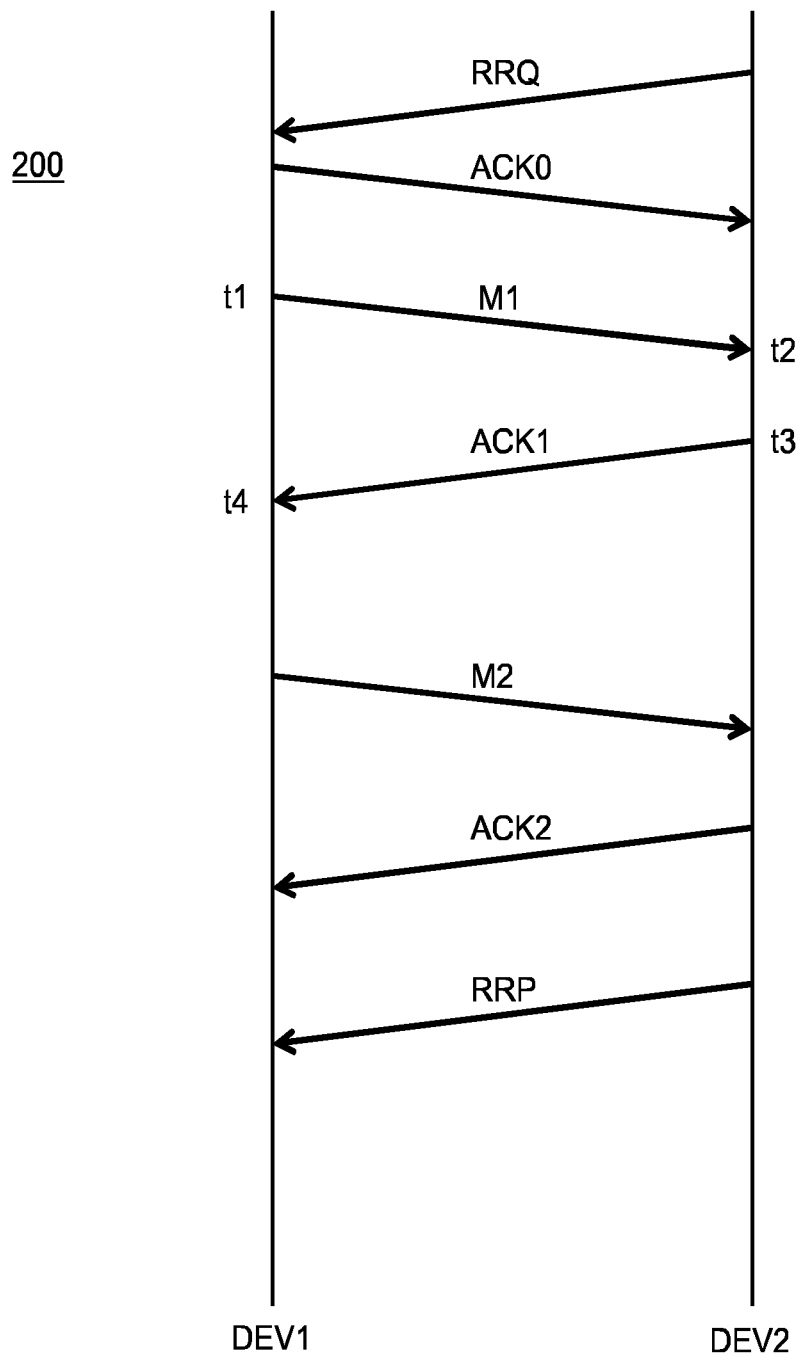
FIG. 2 shows a ranging protocol.

FIG. 2 shows a schematic diagram of a ranging protocol. According to the protocol a first device DEV1 exchanges messages to a second device DEV2 as indicated by arrows between two vertical timelines representing the progress of time in downward direction. Initially the second device sends a request message RRQ to initiate a round trip time measurement, which is a sequence of messages, time measurements and calculations as described now. The request message is acknowledged by a message ACK1 from the first device to the second device. It is noted that the ranging protocol may alternatively be initiated by the first device.

Subsequently the first device sends measurement message M1 at a first time t1, also called time of departure of M1. The second device receives the measurement message M1 at a second time t2, also called time of arrival of M1. Then the second device transmits a measurement acknowledge ACK1 at a third time t3, also called time of departure of ACK1, and the first device receives the measurement acknowledge ACK1 at a fourth time t4, also called time of arrival of ACK1. The time interval between t1 and t4 may be called round trip time, while the interval between t2 and t3 may be called response time. The times t1,t4 and t2,t3 are detected by the respective message processor using a local clock signal or any other available clock signal having a frequency that is high enough to represent time differences of a few nanoseconds to enable calculating distances up to a few meters travelled by the messages M1 and ACK 1 during the round trip time measurement representative of the distance 140 between the devices.

In the first device the first transceiver is arranged for transmitting and receiving the above messages. The first message processor is arranged for processing the messages according to the predetermined protocol and the ranging protocol. Specifically the first message processor determines first time data representing a time interval between the first time t1 and the fourth time t4. Subsequently, in a message M2, the first time data is send to the second device, which may send an acknowledge message ACK2. For example, the first time data in message M2 contains the values of t1 and t4, or the interval between t1 and t4. Finally the first message processor receives a determined distance from the second device in a report, for example in a range report message RRP.

In the second device the second transceiver is arranged for transmitting and receiving messages. The second message processor is arranged for processing the messages according to the predetermined protocol and the ranging protocol. Specifically the second message processor determines second time data representing a time interval between the second time t2 and the third time t3. Subsequently, in the message M2, the second message processor receives the first time data. Then the second message processor determines the distance by determining a travelling time of the messages between the first device and the second device based on the first time data and the second time data. Finally the second message processor transfers the determined distance to the first device in a report, for example in the range report message RRP. Alternatively, the second device may transfer the second time data to the first device or a further distance calculation device, which respective device performs the calculation of the determined distance based on the second time data as received from the second device.

In order to accurately measure the round trip time between the two wireless devices, it requires both wireless devices to participate in the time measurements, for example by measuring t1 and t4, or t2 and t3 in the exemplary FTM mechanism defined in IEEE 802.11REV-mc, and send the measurement data of the time instants (t1, t2, t3, t4), the intervals (t3−t2, t4−t1) or the resulting calculated distance to the other device. In FTM devices are called stations STA, and a Receiving STA can request a Sending STA to send FTM frames that contain a specific set of timing information, in particular t1 and t4 as described above. Based on the received timing information from the Sending STA and the local timing information t2 and t3 at the Receiving STA, the Receiving STA is able to measure the RTT at a granularity of 0.1 ns. Based on the RTT measurement, the Receiving STA is able to calculate its distance to the Sending STA very precisely. It is noted that the FTM procedure between two STAs can take place pre-association.

However, a wireless device that deliberately wants to cheat the system by pretending that it is very close by, whilst in reality being much further away, for example to get an automatic action to be triggered on another wireless device (such as automatic access to a localized service without further authentication), can easily send the wrong measurements to the another wireless station. For example, the device acting as the second device DEV2 can use values for t2 and t3 with a larger difference than in reality and/or intentionally miscalculate and/or misreport the distance to be lower than the actual physical distance.

Now a mechanism is described that enable a wireless device that offers a localized service to validate the received timing/distance measurements before initiating or allowing an automatic action to be triggered. The benefits of doing so prevents possible abuse, which means the validated distance/location can be used as a possible "authentication" step that may be used instead of or in addition to other authentication mechanisms such as Wi-Fi Protected Setup, and hence is very helpful in increasing the ease of use of Wi-Fi based services. It also enables Wi-Fi location based services to be a viable alternative for other location based service mechanisms that are considered to be more safe, e.g. based on other technologies such as NFC and coded light.

In the mechanism the distance between a first and a second wireless device is determined by performing time measurements on wireless messages. The first wireless station subsequently validates the values received from the second wireless station to determine if the values adhere to reference criteria. If so, the received values are considered valid, and the first device takes the determined distance as reliable. For example the first device may now automatically accept an incoming connection request from the second device. The mechanism is as follows.

The first message processor is arranged, for assessing the determined distance, to determine third time data by subtracting from the first time data a calculated travelling time of the messages between the first device and the second device based on the determined distance. Subsequently the first message processor is arranged to obtain a reference interval value for the second device indicative of an interval between receiving a measurement message and transmitting a measurement acknowledge. Finally the first message processor is arranged to verify whether the determined distance is reliable by comparing the third time data to the reference interval value. In an embodiment, the first message processor is arranged for said verifying to compare the third time data to the reference interval value, and, if deviating by more than a predetermined error margin, qualify the determined distance as not reliable. The error margin may be expressed in time representing a corresponding error margin in meters according to the speed of light.

In the device the first message processor is arranged to determine identifier data indicative of hardware and/or software present in the second device, and to obtain the reference interval from a database based on the identifier data. Such a database may contain reference intervals for respective known hardware devices, for example chip sets or mobile devices of known types. For example the type of second device may be known to be an Apple iPhone 6, and the database may have the reference data for that type of mobile phone. So, optionally, the first message processor is arranged to derive the identifier data from a message of the predetermined protocol from the second device. If the manufacturer or model of the second device cannot be determined or for some reason the device or device type is deemed unreliable or reference data is not available the first message processor may signal this for further processing, e.g. for triggering a different authentication process.

The identifier data may be derived from other messages in the predetermined protocol, or from a different layer in the communication stack. For example the MAC address of the second device that is available from the MAC header in the Wi-Fi protocol can be used to determine the manufacturer of the device or the Wi-Fi chipset used within the device. This can be done by the first message processor using a webservice such as available from http://www.macvendorlookup.com or by using an internal stored database based on the official list on http://standards-oui.ieee.org/oui.txt. In addition to the manufacturer or device type the service or a further database should contain reference data based on specifications or reference measurements for the device.

Obtaining reference data for the database may be difficult in practice. In an embodiment the first message processor is arranged to adapt the database by storing and/or updating at least one reference value based on measurement data of the second device. For example a 'self-learning system' may be made in which the database is dynamically built up by storing and updating reference values for a range of MAC addresses based on measurement data from second devices. The initial database may contain a limited set of reference values for popular devices (considering that the top 10 smartphone devices cover a significant majority of the market). When a device is not yet in the database, a more reliable authentication method may be demanded after which the device type may be added to the database. Unreliable or improbable measurements values shall not be used to update the database.

In an embodiment, the ranging protocol comprises a reference message. The reference message may for example be added to the ranging protocol as defined in IEEE 802.11 [ref. 1]. Such reference message may be triggered by a preceding reference request message, or may be a standard part of the ranging protocol, for example included in the initial ranging request RRQ. The first message processor is arranged for said obtaining the reference interval based on the reference message as received from the second device. Subsequently the reference interval is compared to the calculated value of the third time data. Additional security may be achieved by having the second device send the reference message before the second device acquires the first time data of the actual round trip time measurement. Thereto the first message processor is arranged for receiving the reference message before sending the first time data.

In an embodiment, the first message processor is arranged for obtaining respective measurement data from multiple respective distance measurements via the ranging protocol and for said assessing by detecting differences between the respective measurement data. By analyzing the results from multiple round trip time measurements the first device may detect anomalies that result from the second device manipulating the ranging protocol. Various examples of analyzing multiple measurements are described now.

In an example embodiment, the first message processor is arranged to execute said multiple respective distance measurements between the first device and the second device. Subsequently differences are determined between the respective second time data of a first respective measurement data and the respective second time data of subsequent respective measurement data. Normally such differences should be about zero, but small differences may be measured due to inaccuracies in the time measurements. To accommodate such inaccuracies a tolerance or margin may be defined, e.g. a predetermined error margin in time or distance (one nanosecond corresponding to about 0.3 meter). If the measured differences are below said margin, the message processor determines that the determined distance is reliable. However, if calculations show a substantial differences in the second time data of the respective measurements, it is assumed that the second devices manipulates the reported distance and the determined distance is not reliable.

In an example embodiment, the first message processor is arranged to execute said multiple respective distance measurements as a sequence of distance measurements between the first device and the second device and to determine a sequence interval between measurements in the sequence. Such a sequence of measurements may be part of the ranging protocol, for example, as in IEEE 802.11 [reference 1]. A database is accessed to retrieve a reference value for sequence interval. Subsequently, the first message processor compares the sequence interval to the reference sequence interval from the database. If the measured interval, e.g. the average value and or a standard deviation, are equal to the reference value within a predetermined margin, the message processor determines that the determined distance is reliable. However, if substantial differences exist between the sequence interval values of the respective measurements, it is assumed that the second devices manipulate the reported distance or second time data and the determined distance is not reliable.

In an example embodiment, the first message processor is arranged to obtain a reverse measurement data from a reverse execution of the ranging protocol between the second device and the first device. As the ranging protocol is now executed by exchanging the roles of the first and second device, the reverse measurement data comprises reverse first time data, i.e. as provided by the second device and transferred to the first device. Optionally the first message processor is arranged to determine the distance as prescribed by the ranging protocol as reversely executed and compare the reverse determined distance to the determined distance as earlier received in the initial instance of the ranging protocol. Both distances should be equal, at least within a tolerance for measurement inaccuracies, if the second device transmitted reliable values for the determined distance and the reverse first time data. Optionally the first message processor is arranged to determine fourth time data by subtracting, from the reverse first time data, the third time data (as used by the first device itself) and a calculated travelling time of the messages between the first device and the second device based on the determined distance. The fourth time data should be about zero, but a small value may be found due to inaccuracies in the time measurements. To accommodate such inaccuracies a tolerance or margin may be defined. If the fourth time data is below said margin, the message processor determines that the determined distance is reliable. The first message processor determines that the determined distance is unreliable if the fourth time data exceeds a predetermined error margin.

It is noted that the reverse execution of the ranging protocol and subsequent use of the reverse measurement data as described above may be applied in addition to, or as an alternative to, the earlier described verification of the determined distance by comparing the third time data to said reference interval value. In such alternative embodiment the reverse ranging protocol may be executed first, which forces a manipulating second device to decide the amount of bogus time that is subtracted from the first time data without knowing the actual distance between the first device and the second device. Then the normal instance of the ranging protocol follows, and the manipulating second device needs to consistently manipulate the second time data, which is complicated and errors therein may be detect easily.

In an additional embodiment the ranging protocol comprises an additional attribute or additional message that may for example be added to the ranging protocol as defined in IEEE 802.11 [ref. 1], containing a credential (e.g. public key) or a hash of a credential or an encrypted credential. The second device has to include such credential or hash of a credential or an encrypted credential as part of the message exchange for the ranging protocol. To be symmetric, also the first device would have to include such credential, hash of a credential or encrypted credential. The preferred field containing the credential or hash of a credential or an encrypted credential in a message of the ranging protocol is a field of which the signal or at least part of the signal transferring that field is used to measure the transmit or arrival time of the message, so that it is very difficult if not impossible for another device to insert its credential or hash of its credential or its encrypted credential in a message that is used to measure distance between the first and second device. The closer (in time) that the signal carrying the credential or hash of a credential or an encrypted credential is to the signal that is used to measure range, or the more overlap between these signals, the better. This way, the first device can be certain that the credential or hash of a credential or an encrypted credential in a message of the ranging protocol is indeed the one of the second devive with which it is executing the range measurement protocol. In one embodiment, the first message processor is arranged to process this credential or hash of a credential or encrypted credential, and verifies if it matches a credential that has previously been used by a device with which it has succesfully performed device authentication and established mutual trust, such as by using the Wi-Fi Protected Setup Protocol, Device Provisioning Protocol, Diffie-Hellman key exchange and/or the 4-way WPA2 handshake. If a match is found, the first device may assume that the distance measurements between the first and second device can be trusted and deemed reliable. If no match is found, the first device will distrust the distance measurements between the first and second device and perform additional steps to verify the reliability of the distance measurements, such as using the mechanisms as described in other embodiments. In another embodiment, the measured values (e.g. the first time data and/or second time data) are encrypted using a key that was agreed or is derived from agreed credentials between the first and second device as established during an earlier device authentication procedure performed between the first and second device.

In an alternative embodiment, the second device has to include a credential or hash of credential or an encrypted credential that will be used during later connection setup. The first message processor is arranged to process and store the received credential or hash of credential or an encrypted credential in conjunction with the measured distance between the first device and the second device, in order to securely correlate the measured distances with the particular device that connects with that credential. Upon setting up the connection between the first and second device, the first device verifies if the same credential or a derivative thereof is used whilst performing the device authentication, such as during performing the Wi-Fi Protected Setup Protocol, Device Provisioning Protocol, Diffie-Hellman key exchange and/or whilst performing the 4-way WPA2 handshake. By doing so, the first device can determine that the device with which it is connecting, is the same device as for which a particular distance measurement was done. In particular, if the credential was a public key and if the setting up the connection between the first and second device included that the second device has successfully proved to device 1 that it has possession of the private key belonging to the public key as credential in the range measurement, the first device can be certain that the second device is the one that it measured the range to and not an imposter.

Figure 3:
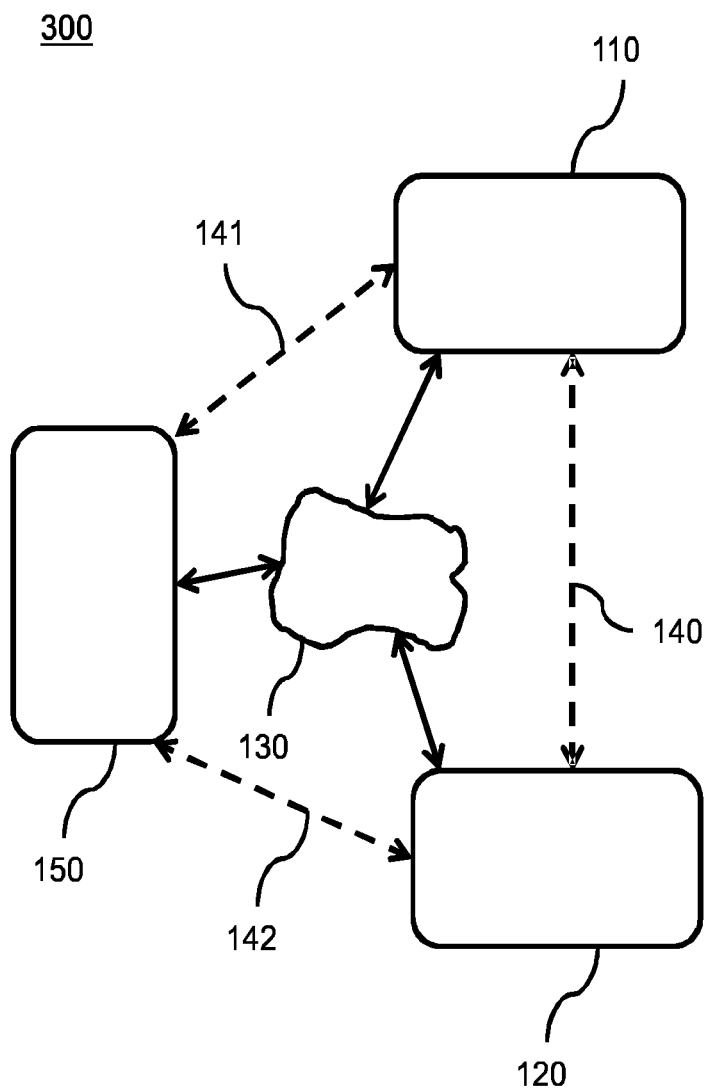
FIG. 3 shows a system of multiple devices for wireless communication and distance measurement.

FIG. 3 shows a system of multiple devices for wireless communication and distance measurement. The system 300 is equal to the system 100 as described above with reference to FIGS. 1 and 2, but further has at least a third device 150. The first device and the second device are physically apart at a distance 140. The first device and the third device are physically apart at a second distance 141, and the second device and the third device are physically apart at a third distance 142. The third device has a third transceiver and a third message processor (not shown), which are similar to the corresponding elements of the second device. The devices are equipped for wireless communication, as schematically indicated by shape 130 and arrows which connect the devices via their respective transceivers. The devices are arranged for distance measurement via the wireless communication according to a predetermined protocol between the first device and the second device, including the ranging protocol as further elucidated above. Various further embodiments are now described using at least the third device for determining said reliability of the distances reported by the second device.

In an example embodiment, the first message processor is arranged to obtain at least one further measurement data from a distance measurement between a further device and the second device, and to obtain the reference interval value from the further measurement data. For example, the further device may also derive the respective second time data during executing the ranging protocol with the second device, using a message processor arranged as in the first device. Subsequently, the further device may transfer said respective second time data to the first device. The first device is now enabled to verify whether the determined distance is reliable by comparing the third time data to the received respective second time data as the reference interval value. As the further device also executes the ranging protocol with the second device suspected of manipulating, the second device now must consistently manipulate both instances of the ranging protocol responding to different devices. Using the same manipulated value for the second time data may be impossible or may result in inconsistent distances, which will be detected by the first device based on the respective second time data as receive from the further device. It is noted that the first and further device need not know their actual distance to still find manipulated values for the second time data.

In a further example embodiment, the first message processor is arranged to obtain at least one further measurement data from a distance measurement between at least one further device and the second device and deriving at least one further determined distance from the further measurement data. Now the first determined distance and the further determined distance can be mapped to the actual physical intermediate distance between the first device and the further device, which may be known, predetermined or also be measured using the ranging protocol. So the first message processor obtains actual position or distance data of the least one further device relative to the first device. Finally the first message processor verifies whether the determined distance is reliable by determining whether an estimated position of the second device relative to the first device is derivable based on the determined distance and the at least one further determined distance. The estimated position is based on basic geometry of the existence of a triangle of the intermediate distance and both determined distances. For example, if the sum of both determined distances is smaller than said intermediate distance, no triangle can be found, making said determined distances unreliable.

Optionally, the first message processor may verify whether the determined distance is reliable by determining whether an estimated position of the second device relative to the first device is in accordance with a predetermined floor plan around the first device. The floor plan indicates where a person carrying the second device may be present, which can be crosschecked using one or more determined distances. For example, if three measurements to three different trusted devices acting as first device are executed, and the positions of said three trusted devices are known relative to the floor plan, it can be determined whether the second device is at a location that can be used by a human walking according to the floor plan.

In a different configuration, the first device performs distance measurement with the third device in order to decide to set up a connection between the first and third device. In this case, when the first device or third device are approached also by the second device to perform distance measurement, it is beneficial if the first device would be able to verify whether the second and third device are operating independently or whether they are cooperating to perform distance measurement (i.e. by the second and third device sending/receiving distance measurement data to/from each other resulting from performing distance measurement by the second device with the first device and/or by the third device with the first device) and if the third device would be able to verify whether the first and second device are operating independently or are cooperating to perform distance measurement. If they are not cooperating, the second device may be a hostile device that tries to impersonate the first or third device by making the measuring device believe that it is at a similar distance as the impersonated device, or that it tries to make the measurement device believe it is actually closer than the impersonated device, by doing its own distance measurements. In a possible embodiment, a device may be configured to reject distance measurement request frames and/or reject authentication requests from the other two devices and/or reject setting up a connection to the other two devices if the device receives distance measurement frames from two or more different devices within a specified short time period, or if the distance measurement request frames from the two or more different devices arrive at an earlier time than a preconfigured time after the first of those two devices has started sending its measurement requests (e.g. in case it was agreed in the protocol that two devices that cooperate to perform distance measurements have to issue their measurement frames at least a certain specified time period after each other and coordinate their measurements accordingly).

In another possible embodiment, if two devices are cooperating to perform distance measurements with a third device, these devices both have to include a common credential (e.g. common symmetric key, public/private key pair) or hash of credential or encrypted credential as part of the distance measurement protocol that they are executing with the third device, that can be verified by the third device for their validity when receiving the distance measurement request frames from both devices, by performing a challenge-response exchange between the third and the first device based on that received credential and a challenge-response exchange between the third and the second device based on that received credential. Hence this embodiment relates in addition to a method and a first device for deciding whether to accept the setup of a wireless connection between the first device and a second device, where the first device is approached also by a third device to perform distance measurement, the method comprising:

cooperating with the second and third device in performing at least a distance measurement with respect each of to the second and third device receive distance measurement frames from the second and the third device different devices deciding not to accept the setup of the wireless connection if at least one of the following conditions are met:

a) the received distance measurement frames are receiving within a predetermined time period, b) the distance measurement request frames from the two or more different devices arrive at an earlier time than a preconfigured time after the first of those two devices has started sending its measurement requests.

Alternatively, the device that receives the distance measurement request frames and the common credential, hash of credential or encrypted credential from the other two devices rejects setting up a connection with any of those two devices if the common credential or a derivative thereof is not used or cannot be correctly verified to be used whilst performing the device authentication between the device and each of the other two devices, such as during performing the Wi-Fi Protected Setup Protocol, Device Provisioning Protocol, Diffie-Hellman key exchange and/or whilst performing the 4-way WPA2 handshake. Hence this embodiment relates in addition to a method and a first device for deciding whether to accept the setup of a wireless connection between the first device and either a second device or a third device, the method comprising:
- cooperating with the second and third device in performing at least a distance measurement with respect each of to the second and third device
- receive a common credential of the second and third device
- deciding not to accept the setup of the wireless connection if the common credential or a derivative thereof is not used or cannot be correctly verified to be used whilst performing the device authentication between the device and each of the other two devices In an embodiment, the first message processor is arranged to determine at least one signal strength of at least one message received during the predetermined protocol, and to verify whether the determined distance is reliable by comparing the signal strength to an expected signal strength at the determined distance. The predetermined protocol may provide information on the received signal strength at the second station. Knowing the transmitted power and the determined distance the expected signal strength can be calculated. So the received signal strength can be compared to the expected signal strength, and deviations can be detected. Optionally, the first station may change the transmitter power until no response is received from the second device, which transmitted signal strength can be predicted knowing the determined distance, and deviations can be detected. For example, if the communication is lost much earlier, i.e. at a higher transmitter power than calculated for the received determined distance, the distance is deemed unreliable.

In an embodiment, the first message processor is arranged, upon assessing that the determined distance is not reliable, to proceed to a different process instead of the expected distance based process. For example, the normal distance based process would be to grant access to a location based service or local peripheral. If the determined distance is deemed unreliable, all further communication and/or access may be refused, and/or warning message may be sent to a management system or guard keeper. Also the first message processor may be arranged, before progressing to any normal distance based process, to engage a different security protocol with the second device may be executed, such as requesting additional credentials and/or a personal identification of the user. The different security protocol may be an additional process or a further enhanced execution of the main protocol, and may e.g. result in a more stringent or severe step in the normal security process. Optionally, the first message processor is arranged to request a further distance measurement using a different ranging protocol and/or a different type of wireless communication, for example NFC at a very close distance or by the human operator of the second device to provide some identification and/or biometrical data like a fingerprint. Also the first message processor may be arranged, before progressing to any normal distance based process, to deny or restrict access to at least some data and/or to at least one application in the first device. For example a basic service may be provided even if the distance is deemed unreliable, while an extended service is provided if the distance is deemed reliable.

In the following various practical embodiments are described. In an exemplary embodiment, a first wireless station offers a Wi-Fi Aware service which indicates it requires measuring the distance by setting e.g. a "ranging" flag to mandatory. A second wireless station that wants to connect to that service needs to perform distance measurement such as using the FTM method as defined in IEEE 802.11REV-mc [ref 1]. In order to do so, the second wireless station assumes the FTM initiator role and issues an FTM request to the first wireless station. If the first wireless station receives an FTM request from the second wireless station, the first wireless station will in its turn initiate an FTM burst and provide the measured timestamps t1 and t4 to the second wireless station, which can use these values to accurately determine the round trip time (RTT) and hence the distance between the first and second wireless station. The second wireless station needs to send the resulting distance in a FTM Measurement Range Report to the first wireless station if the first wireless station set the Ranging Report bit in the Ranging Setup Attribute to 1. The first wireless station would need to trust the measurements it receives in order to determine the subsequent steps for the second wireless station, such as automatically accepting an incoming connection request.

In order for the first wireless station to validate the measured distance, one or more of the following mechanisms may be used. Since the first wireless station knows t1 and t4 (let's say in nanoseconds), it can calculate the value (t3−t2) as follows using the received range result value (let's say in meters) from the second wireless station "d1":

$$(t3-t2)=-(2*(d1/\text{speed of light})*10^9-(t4-t1))$$

For example if d1 is about 1 meter, and t4−t1=13 ns then t3−t2=7 ns. That means it took about 2 times 3 ns travelling time and processing the request on second wireless station (i.e. t3−t2) took 7 nanoseconds. As mentioned before, if the second wireless station wants to claim it is close by even when it is not, the t3−t2 would in reality be shorter. Since the actual measurements need to be so precise in nanoseconds resolution, they are likely to take place inside the hardware of the Wi-Fi chip (not in any software driver layer that may be used e.g. to send FTM range measurement report), so the determined value of t3−t2 can be verified with the specification of the Wi-Fi chipset being used.

In one embodiment, the first wireless device checks a database of information about actual processing time, and optionally also possible error margin, for FTM requests for the Wi-Fi chipset being used by the second wireless device. The Wi-Fi chipset being used can be derived from various sources of information (such as P2P Information Elements) received during pre-association discovery (e.g. using probe request/response frames, beacon frames), such as which MAC address range is used, manufacturer information/device model being advertised, radio characteristics such as defined in well known protocols IEEE 802.11k and IEEE 802.11h. If the measured processing time corresponds to information in the database, then the measured distance is considered to be valid and the first wireless station can go into a next state with respect to second wireless station, such as a state in which it will automatically accept an incoming connection request from the second wireless station without further authentication (e.g. using Open Security or WFDS Default PIN method as defined by Wi-Fi Direct Services) and/or additional user interaction (e.g. auto-accept=true session accept state as defined by Wi-Fi Direct Services, or by issuing a status "Accepted by User" during a subsequent Provision Discovery without actually asking the user). However, if the measured processing time does not correspond to the information in the database within a certain error/safety margin, then the first wireless station will act differently. For example, the first station will not automatically accept an incoming connection request from the second station, and may request the second wireless station to use a different authentication method (e.g. PIN, Push Button, or other WPS configuration method by setting a "config method" attribute to the appropriate value, or e.g. by checking if the second wireless station is part of the same secure wireless network as the first wireless station for example using ping messages to a MAC address corresponding or derived from the MAC address used by the second wireless station during FTM measurements, whilst both connected securely to a WLAN access point).

In another embodiment, multiple FTM measurements and/or ranging reports are requested, e.g. in an FTM burst. The second wireless station can only know how to manipulate its distance after it has received t1 and t4 from the first wireless station. Manipulating t3−t2 may be difficult. Unless second wireless station changed its radio to always send the ACK on t3 with a delay, the first t3 and t4 in the burst may be quite different from the subsequent measurements in the FTM burst.

In a further embodiment enhanced FTM measurement devices may be mandated to first send the values for t2 and t3 in a message to first wireless station before the first wireless station sends its t1 and t4 to the second wireless station. The first wireless station may use any strange differences in measurements to mark the measurements from the second wireless station as being suspicious and not automatically accept an incoming connection request from the second wireless station.

In a further embodiment, the first wireless station will act (also) as an FTM initiator, i.e. initiating a reverse distance measurement, and issue an FTM request to the second wireless station. The second wireless station now has to measure t1 and t4 and transfer these to the first wireless station. Again the first wireless station can cross validate with a database if the measurements for t1 and t4 are done within the parameters and/or behaviour of the Wi-Fi chipset being used. For example, verify whether start times of sending the FTM measurement frames (in a burst) correspond to the normal interval used in the Wi-Fi chipset between two consecutive FTM measurement frames given the attribute values in the FTM request, such as Partial TSF Timer or minimum delta as explained in 10.24.6.4 Measurement exchange.

In a further embodiment, the first wireless station may request a third wireless station, e.g. another Access Point in a Wireless Distribution System or Wi-Fi Aware NAN cluster, or a close by trusted P2P device, to perform distance measurement with the second wireless station. For example, in an internet café or office there will often be multiple WLAN Access Points in the near vicinity that could act as a trusted third and fourth station. These measurements of which the results are transferred to the first wireless station, in conjunction with distance measurements done between the first and third station, and other information provided by the third wireless station about the second wireless station. Such other information may include reported signal strength, noise histogram, and other wireless signal parameters, which may be used to cross-validate the measurements between the first and second wireless station. For example, if the measured (t3−t2) in case of the third wireless station is different from (t3−t2) in case of the first wireless station, the location of the second wireless station may be marked as suspicious, upon which the first wireless station will act accordingly e.g. by requiring additional authentication. Also suspicious would be if the measured distances between the first and second and third and second stations would not correspond to reported signal strengths of the second station in relation to the first and third wireless station. E.g. if it is measured to be very close to both the first and third wireless station using FTM based approach, but the signal strength is quite different, then this is suspicious because one would expect the second station to be right in between the first and third station in that case. This can be further refined by using direction information (e.g. using MIMO signal analysis, using beamforming information, obscuring part of the antenna, mechanically rotating the device, using differently physically located antenna's) or motion analysis (e.g. is the second station moving away from one and moving closer to another station) by doing multiple distance measurements during a longer time interval. Optionally, if the measurements are cross-validated with measurements from a fourth wireless station (e.g. using trilateration), then certainly one of the measured distances would be wrong if the second wireless station has purposely provided the wrong values for distance measurements.

In a further embodiment, the first wireless station may reduce its signal strength by reducing its radio power in accordance with the measured distance between the first and second wireless station. If the connection drops unexpectedly, then the first wireless station may derive that the second wireless station is not within the proper signal range and may mark the measured distance as suspicious. Of course if the second wireless device uses a very strong radio it may circumvent this check, so it is not a definite way of deciding the measurement is non-suspicious. In an alternative embodiment, the first station generates an out-of-band signal that only a person that claims to be at a certain distance can notice, e.g. spoken instructions or show a message on a nearby screen, for example with a request to the user to move closer to the first wireless station, which is then verified by the first wireless station.

In a further embodiment, the first wireless station may track the location of the second device for a longer time and correlate the trajectory with a floor map, e.g. to see if the trajectory makes sense given the walkways inside the building (e.g. person does not walk through walls, but through doors, and does not walk straight through a table or couch). In case the second wireless station is supposed to be a stationary device (such as a nearby display) and the first wireless station is a mobile device, then the movement pattern of the first wireless station can be used to see if it matches the measured distances to see if the first wireless station really comes closer to the second wireless station when walking towards it.

Figure 4:
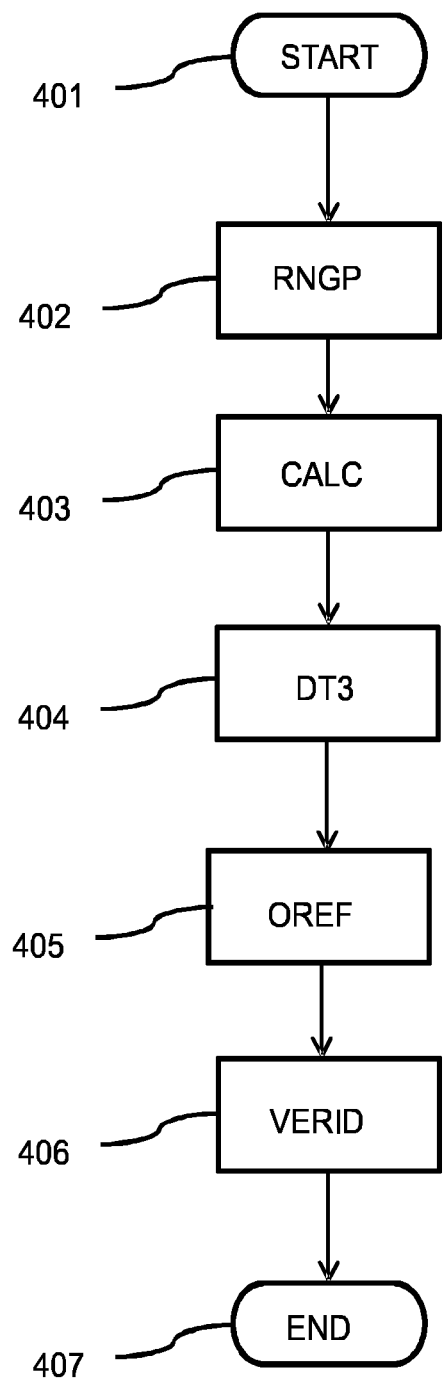
FIG. 4 shows a method for distance measurement via wireless communication.

FIG. 4 shows a method for distance measurement via wireless communication according to a predetermined protocol between a device acting as a first device and a further device for wireless communication acting as a second device. The devices are physically apart at a distance 140. The devices are arranged for distance measurement via the wireless communication according to a predetermined protocol between the first device and the second device. The predetermined protocol includes a ranging protocol for determining a distance between the first and the second device, as further detailed below with reference to FIG. 2. The first device and the second device are similar to the first and second device as shown in FIG. 1 and further described with reference to the FIGS. 1-3. The method may be executed by a processor in the first device, by may also be processed by a processor in a different device and/or at a different time based on the received values. For example, the method may be executed at a third device that is not actively participating in the ranging protocol, but receives all messages and is aware of the distance between the third device and the third device. If at a close distance to the first device, the third device can verify all data by receiving the protocol messages of the ranging protocol.

The method starts at node START 401. In a first stage RNGP 402 the method may execute the ranging protocol and perform the time measurements as described with reference to FIG. 2. The method obtains the determined distance and is aware of the first time data of the first device. Next, in stage CALC 403, the method calculates the travelling time of the messages between the first device and the second device based on the determined distance. For assessing the determined distance, the method continues by stage DT3 404 in which third time data is determined by subtracting from the first time data the calculated travelling time of the messages. Next, in stage OREF 405 identifier data is determined that is indicative of hardware and/or software present in the second device. Also, from a database based on the identifier data, a reference interval value is obtained for the second device. The reference interval is indicative of an interval between receiving a measurement message and transmitting a measurement acknowledge, which is to be expected for the second device. The reference interval may be obtained in various ways, which are described above with reference to the message processor in the first device. In the example, the reference interval is obtained from a database, either locally accessible or remotely via internet by connecting to a provider server using a method as described below with reference to FIG. 5. Next, in stage VERID 406, the method verifies whether the determined distance is reliable by comparing the third time data to the reference interval value. The method terminates at node END 407.

Figure 5:
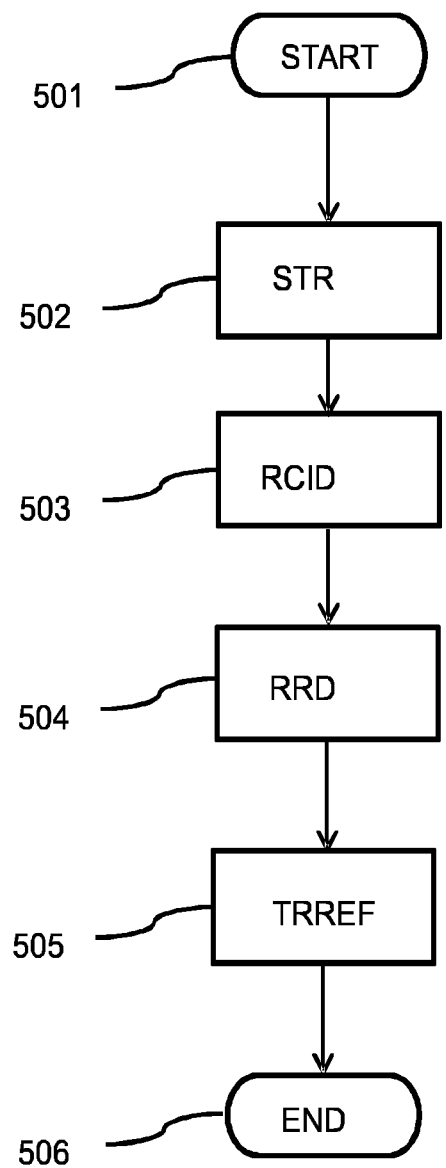
FIG. 5 shows a provider server method for providing reference information.

FIG. 5 shows a provider server method for providing reference information for use in a provider server for cooperating with a device as described above with reference to FIGS. 1 and 2. The method starts at node START 501. In a first stage STR 502 the method may execute storing reference time data for respective devices indicative of processing time in the ranging protocol. This stage may be performed only once, e.g. at manufacture or initialization of the provider server. The database may also be updated regularly when new reference data becomes available. Next, in stage RCID 503, the method receives, from a requesting device, identifier data indicative of hardware and/or software present in a second device that is to be verified. Next, in stage RRD, respective reference time data for the second device based on the identifier data is retrieved. The reference time data is indicative of the reference interval value for the second device. Next, in stage TRREF 505 the retrieved reference time data is transmitted to the first device. Thereby the requesting device is enabled to verify whether the determined distance is reliable by comparing the third time data as calculated to the reference interval value.

Computer program products, downloadable from a network and/or stored on a computer-readable medium and/or microprocessor-executable medium, are provided that comprise program code instructions for implementing the above methods when executed on a computer for protecting location information, as elucidated further below.

The above system may be applied, for example, in indoor and outdoor positioning systems, or location-based services using wireless devices. The invention applies generally to any system wherein conditionally data or location based services are provided to a user based on the distance of a mobile device to the device that measures the distance. For example, the system can be applied in portable devices and stationary devices supporting Wi-Fi, Wi-Fi Aware, or Wi-Fi Direct.

Also, the system or methods according to the present invention may be used in conjunction with one or more indoor location technologies based on visible light or radio frequency signals. Also, such indoor location technologies may make use of established RF communication standards such as 802.15.7, 802.11, 802.15.4, Zigbee, Thread or Bluetooth® Low Energy (BLE) also known as Bluetooth® Smart. Notably the claimed invention may make use of multiple location technologies; for example in order to accommodate for an installed base and/or to enable participants to use their technology of preference.

Typically, the device 110 for distance measurement and the device 120 that acts as a second device to be measured, and the provider server each comprise a processor which executes appropriate software stored at the devices; for example, that software may have been downloaded and/or stored in a corresponding memory, e.g., a volatile memory such as RAM or a non-volatile memory such as Flash (not shown). The devices and servers may for example be equipped with microprocessors and memories (not shown). Alternatively, the devices and server may, in whole or in part, be implemented in programmable logic, e.g., as field-programmable gate array (FPGA). The devices and server may be implemented, in whole or in part, as a so-called application-specific integrated circuit (ASIC), i.e. an integrated circuit (IC) customized for their particular use. For example, the circuits may be implemented in CMOS, e.g., using a hardware description language such as Verilog, VHDL etc.

Many different ways of executing the method are possible, as will be apparent to a person skilled in the art. For example, the order of the stages or steps can be varied or some stages may be executed in parallel. Moreover, in between steps other method steps may be inserted. The inserted steps may represent refinements of the method such as described herein, or may be unrelated to the method. For example, stage STR 502 and RCID 503 of the provider server method be executed, at least partially, in parallel, with the stages RNGP 402, CALC 403 and DT3 404 of the device method. Moreover, a given step may not have finished completely before a next step is started.

A method according to the invention may be executed using software, which comprises instructions for causing a processor system to perform the respective method. Software may only include those steps taken by a particular sub-entity of the system. The software may be stored in a suitable storage medium, such as a hard disk, a floppy, a memory etc. The software may be sent as a signal along a wire, or wireless, or using a data network, e.g., the Internet. The software may be made available for download and/or for remote usage on a server. A method according to the invention may be executed using a bitstream arranged to configure programmable logic, e.g., a field-programmable gate array (FPGA), to perform the method. It will be appreciated that the software may be in the form of source code, object code, a code intermediate source and object code such as partially compiled form, or in any other form suitable for use in the implementation of the method according to the invention. An embodiment relating to a computer program product comprises computer executable instructions corresponding to each of the processing steps of at least one of the methods set forth. These instructions may be subdivided into subroutines and/or be stored in one or more files that may be linked statically or dynamically. Another embodiment relating to a computer program product comprises computer executable instructions corresponding to each of the means of at least one of the systems and/or products set forth.

Figure 6A:
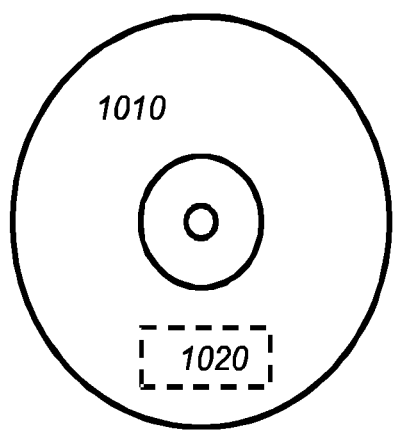
FIG. 6a shows a computer readable medium.

FIG. 6a shows a computer readable medium 1000 having a writable part 1010 comprising a computer program 1020, the computer program 1020 comprising instructions for causing a processor system to perform one or more of the above methods in the system as described with reference to FIG. 1-5. The computer program 1020 may be embodied on the computer readable medium 1000 as physical marks or by means of magnetization of the computer readable medium 1000. However, any other suitable embodiment is conceivable as well. Furthermore, it will be appreciated that, although the computer readable medium 1000 is shown here as an optical disc, the computer readable medium 1000 may be any suitable computer readable medium, such as a hard disk, solid state memory, flash memory, etc., and may be non-recordable or recordable. The computer program 1020 comprises instructions for causing a processor system to perform said methods.

Figure 6B:
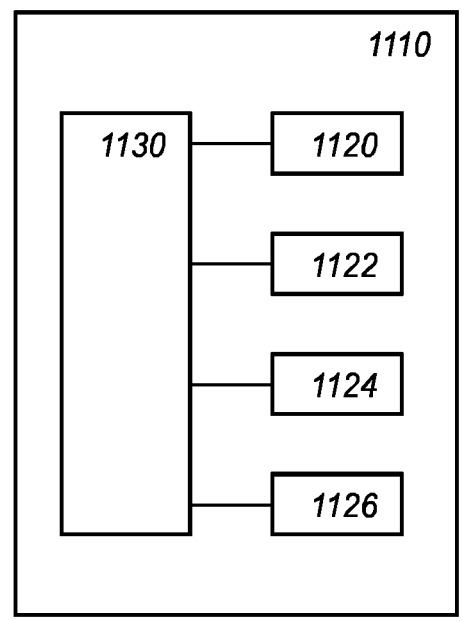
FIG. 6b shows in a schematic representation of a processor system.

FIG. 6b shows in a schematic representation of a processor system 1100 according to an embodiment of the device or server as described with reference to FIG. 1-5. The processor system comprises one or more integrated circuits 1110. The architecture of the one or more integrated circuits 1110 is schematically shown in the Figure. Circuit 1110 comprises a processing unit 1120, e.g., a CPU, for running computer program components to execute a method according to an embodiment and/or implement its modules or units. Circuit 1110 comprises a memory 1122 for storing programming code, data, etc. Part of memory 1122 may be read-only. Circuit 1110 may comprise a communication element 1126, e.g., an antenna, connectors or both, and the like. Circuit 1110 may comprise a dedicated integrated circuit 1124 for performing part or all of the processing defined in the method. Processor 1120, memory 1122, dedicated IC 1124 and communication element 1126 may be connected to each other via an interconnect 1130, say a bus. The processor system 1110 may be arranged for contact and/or contact-less communication, using an antenna and/or connectors, respectively.

In summary, a first device for distance measurement via wireless communication uses a ranging protocol for determining a distance to a second device via a round trip time measurement, wherein first time data represents the round trip time and second time data represents a response time between receiving a request and sending a corresponding acknowledge. The second device receives the round trip time and determines the distance. The first device determines third time data by subtracting from the first time data a calculated travelling time of the messages between the first device and the second device based on the determined distance, obtains a reference interval value for the second device indicative of an interval between receiving a request and transmitting an acknowledge, and verifies whether the determined distance is reliable by comparing the third time data to the reference interval value.

It will be appreciated that, for clarity, the above description describes embodiments of the invention with reference to different functional units and processors. However, it will be apparent that any suitable distribution of functionality between different functional units or processors may be used without deviating from the invention. For example, functionality illustrated to be performed by separate units, processors or controllers may be performed by the same processor or controllers. Hence, references to specific functional units are only to be seen as references to suitable means for providing the described functionality rather than indicative of a strict logical or physical structure or organization. The invention can be implemented in any suitable form including hardware, software, firmware or any combination of these.

It is noted that in this document the word 'comprising' does not exclude the presence of elements or steps other than those listed and the word 'a' or 'an' preceding an element does not exclude the presence of a plurality of such elements, that any reference signs do not limit the scope of the claims, that the invention may be implemented by means of both hardware and software, and that several 'means' or 'units' may be represented by the same item of hardware or software, and a processor may fulfill the function of one or more units, possibly in cooperation with hardware elements. Further, the invention is not limited to the embodiments, and the invention lies in each and every novel feature or combination of features described above or recited in mutually different dependent claims.

REFERENCE DOCUMENT

[1] IEEE P802.11-REVmc/D4.2, September 2015
IEEE Standard for Information technology
Telecommunications and information exchange between systems
Local and metropolitan area networks
Specific requirements
Part 11: Wireless LAN Medium Access Control (MAC) and Physical Layer (PHY)
Specifications
Chapter 10.24.6 Fine timing measurement procedure, pages 1773-1784.

The invention claimed is:

1. An apparatus for measuring a distance via wireless communication between a first device and a second device, comprising:
   a predetermined protocol for determining the distance between the first and the second device based on a round trip time measurement, wherein the first device sends a measurement message at a first time, the second device receives the measurement message at a second time, the second device transmits a measurement acknowledge at a third time, and the first device receives the measurement acknowledge at a fourth time;
   a transceiver configured for transmitting and receiving messages; and
   a processor configured for generating the messages to be transmitted and processing the received messages, wherein the processor is further configured to:
      determine first time data representing a first interval between the first time and the fourth time;
      determine second time data representing a second interval between the second time and the third time;
      determine the distance by calculating a travelling time of the messages between the first device and the second device based on the first time data and the second time data;
      determine third time data by subtracting the travelling time of the messages from the first time data;
      determine identifier data indicative of hardware and/or software present in the second device;
      obtain from a database, based on the identifier data, a reference interval value for the second device indicative of an interval between receiving the measurement message and transmitting the measurement acknowledge; and
verifying the distance by comparing the third time data and the reference interval value.

2. The apparatus as claimed in claim 1, wherein the processor is further configured to derive the identifier data from a message of the predetermined protocol from the second device.

3. The apparatus as claimed in claim 1 wherein the processor is configured to update at least one reference interval value in the database based on measurement data of the second device.

4. The apparatus as claimed in claim 1, wherein the predetermined protocol comprises a reference message, and the processor is configured for obtaining the reference interval value based on the reference message received from the second device.

5. The apparatus as claimed in claim 4, wherein the processor is configured for receiving the reference message before sending the measurement message.

6. The apparatus as claimed in claim 1, wherein the processor is configured for obtaining respective measurement data from multiple respective distance measurements via the predetermined protocol and detecting differences between the respective measurement data.

7. The apparatus as claimed in claim 6, wherein the processor is configured to:
execute said multiple respective distance measurements between the first device and the second device and to determine differences between the respective second time data of a first respective measurement data and the respective second time data of subsequent respective measurement data;
execute said multiple respective distance measurements as a sequence of distance measurements between the first device and the second device and to determine a sequence interval between measurements in the sequence, and compare the sequence interval to a reference sequence interval from a database; or
obtain at least one further measurement data from a distance measurement between a further device and the second device, and to obtain the reference interval value from the further measurement data.

8. The apparatus as claimed in claim 6, wherein the processor is configured to:
obtain a reverse measurement data from a reverse execution of the predetermined protocol between the second device and the first device, the reverse measurement data comprising reverse first time data;
determine fourth time data by subtracting from the reverse first time data the third time data and a travelling time of the messages between the first device and the second device based on the determined distance; and
determine that the distance is unreliable if the fourth time data exceeds a predetermined error margin.

9. The apparatus as claimed in claim 6, wherein the processor is configured to:
obtain at least one further measurement data from a distance measurement between at least one further device and the second device and derive at least one further determined distance from the further measurement data;
obtain actual position data of the least one further device relative to the first device; and
verify the determined distance by determining whether an estimated position of the second device relative to the first device is derivable based on the determined distance and the at least one further determined distance; or
verify the determined distance by determining whether an estimated position of the second device relative to the first device is in accordance with a predetermined floor plan around the first device.

10. The apparatus as claimed in claim 1, wherein the processor is configured to:
determine at least one signal strength of at least one message received during the predetermined protocol; and
verify the determined distance by comparing the signal strength to an expected signal strength at the determined distance.

11. The apparatus as claimed in claim 1, wherein the processor is further configured to at least one of:
require executing a different security protocol with the second device;
request a further distance measurement using a different ranging protocol and/or a different type of wireless communication;
deny or restrict access to at least some data and/or to at least one application in the first device.

12. A method for measuring a distance via wireless communication between a first device and a second device, comprising:
a processor providing a predetermined protocol for determining the distance between the first and the second device based on a round trip time measurement, wherein the first device sends a measurement message at a first time, the second device receives the measurement message at a second time, the second device transmits a measurement acknowledge at a third time, and the first device receives the measurement acknowledge at a fourth time;
the processor determining first time data representing a first interval between the first time and the fourth time;
the processor determining second time data representing a second interval between the second time and the third time;
the processor determining the distance by calculating a travelling time of the messages between the first device and the second device based on the first time data and the second time data; and
the processor determining third time data by subtracting the travelling time of the messages from the first time data;
the processor determining identifier data indicative of hardware and/or software present in the second device;
obtaining from a database, based on the identifier data, a reference interval value for the second device indicative of an interval between receiving the measurement message and transmitting the measurement acknowledge; and
verifying the distance by comparing the third time data and the reference interval value.

13. The apparatus as claimed in claim 1, wherein after comparing the third time data and the reference interval value, if a comparison deviates by more than a predetermined error margin, then the determined distance is considered as not reliable.

14. A non-transitory computer-readable medium having one or more executable instructions stored thereon, which when executed by a processor, cause the processor to perform a method for measuring a distance via wireless communication between a first device and a second device, the method comprising:

a processor providing a predetermined protocol for determining the distance between the first and the second device based on a round trip time measurement, wherein the first device sends a measurement message at a first time, the second device receives the measurement message at a second time, the second device transmits a measurement acknowledge at a third time, and the first device receives the measurement acknowledge at a fourth time;

the processor determining first time data representing a first interval between the first time and the fourth time;

the processor determining second time data representing a second interval between the second time and the third time;

the processor determining the distance by calculating a travelling time of the messages between the first device and the second device based on the first time data and the second time data; and the processor determining third time data by subtracting the travelling time of the messages from the first time data;

the processor determining identifier data indicative of hardware and/or software present in the second device;

obtaining from a database, based on the identifier data, a reference interval value for the second device indicative of an interval between receiving the measurement message and transmitting the measurement acknowledge; and verifying the distance by comparing the third time data and the reference interval value.

15. A method comprising:

a transceiver sending a measurement message from a first device to a second device at a first time;

the transceiver receiving the measurement message at the second device at a second time;

the transceiver transmitting an acknowledgement message from the second device at a third time;

the transceiver receiving the acknowledgement message at the first device at a fourth time;

a processor determining a traveling time based on a difference between the first time and the fourth time;

the processor determining a processing time at the second device based on a difference between the second time and the third time;

the processor determining a distance from the first device to the second device based on at least one of: a difference between the traveling time and the processing time, or a difference between the first time and the second time, or a difference between the third time and the fourth time;

obtaining, from a database, a reference interval value based on an identifier of the second device;

comparing the processing time to the reference interval value to determine whether the determined distance is reliable.

16. The method of claim 15, comprising:

communicating at least one of: a) the second and third times, or b) the difference between the second and third times, from the second device to the first device;

wherein the first device determines the distance.

17. The method of claim 15, comprising:

communicating the first time from the first device to the second device;

wherein the second device determines the distance and communicates the distance to the first device.

18. The method of claim 15, comprising communicating the identifier of the second device from the second device to the first device.

19. The method of claim 15, comprising:

communicating the identifier of the second device to a third device, wherein the third device obtains the reference interval time based on the identifier of the second device.

20. The method of claim 19, comprising communicating the reference interval time from the third device to the first device.

* * * * *